US006561335B2

(12) United States Patent
Klawitter

(10) Patent No.: US 6,561,335 B2
(45) Date of Patent: May 13, 2003

(54) ROTARY CLUTCH ASSEMBLY HAVING INTERLOCKING HUBS

(75) Inventor: Scott R. Klawitter, Beaver Dam, WI (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/934,456

(22) Filed: Aug. 22, 2001

(65) Prior Publication Data

US 2003/0038011 A1 Feb. 27, 2003

(51) Int. Cl.⁷ .................. F16D 47/04; F16D 41/066
(52) U.S. Cl. ........................ 192/48.92; 192/45
(58) Field of Search .................. 192/41 R, 45, 192/48.1, 48.92; 242/372

(56) References Cited

U.S. PATENT DOCUMENTS

| 300,503 A | 6/1884 | Rascoe |
| 1,273,952 A | 7/1918 | Tibbetts |
| 1,618,915 A | 2/1927 | Constantinesco |
| 2,140,737 A | 12/1938 | Dickens ................ 192/27 |
| 2,158,544 A | 5/1939 | Keller ................. 192/105 |
| 2,554,305 A | 5/1951 | Luehrs ................. 192/45 |
| 2,684,741 A | * 7/1954 | Gregory ............... 192/48.1 |
| 2,797,592 A | * 7/1957 | Marrapese ............. 192/69.8 |
| 2,902,125 A | 9/1959 | House et al. ........... 192/45 |
| 3,360,927 A | 1/1968 | Cornelius ............. 60/30 |
| 4,415,072 A | 11/1983 | Shoji et al. ............ 192/45 |
| 4,461,375 A | 7/1984 | Brown ................. 192/64 |
| 5,129,495 A | * 7/1992 | Johnston et al. ....... 192/48.92 |
| 5,404,976 A | * 4/1995 | Lihrmann ............ 192/48.92 |
| 5,632,453 A | 5/1997 | Hoiki et al. ............ 242/385 |

* cited by examiner

Primary Examiner—Richard M. Lorence
(74) Attorney, Agent, or Firm—Marcus R. Mickney; Alfred N. Goodman; Mark S. Bicks

(57) ABSTRACT

A rotary clutch assembly comprises a first hub and a second hub. The first hub has first and second ends. An inner surface in the first hub is defined by a first internal passageway extending from the first end to the second end for receiving shaft. One of the first and second ends of the first hub has a first notch. The second hub has first and second ends and an outer surface. An inner surface in the second hub is defined by a second internal passageway extending from the first end to the second end for receiving the first hub. One of the first and second ends of the second hub has a second notch. Multiple clutch assemblies may be coupled on a single shaft to form a drive assembly having increased torque capacity by engaging the first and second notches of a first clutch assembly with first and second notches of a second clutch assembly.

43 Claims, 5 Drawing Sheets

ROTARY CLUTCH ASSEMBLY HAVING INTERLOCKING HUBS

FIELD OF THE INVENTION

The invention relates to a rotary clutch assembly. More particularly, the invention relates to a rotary clutch assembly having interlocking hubs for connecting multiple rotary clutch assemblies together on a single shaft.

BACKGROUND OF THE INVENTION

Rotary clutch assemblies are useful for applications in which a flexible member, such as a cable, rope, hose, conductor, electrical cord or the like (hereinafter referred to as the "cable"), is wound on a spool of a take-up reel assembly for storage when not in use, and which is paid out by unwinding the cable from the spool of the take-up reel assembly to the appropriate length required. The cable stored on the reel assembly may be used to carry any required type of matter, such as air, water, oil, grease, or electricity. A frame supports the clutch assembly and the reel assembly.

One example of an application for a rotary clutch assembly is temporarily supplying electrical power to an apparatus. An electrical power supply is electrically connected to the frame. The first end of the cable is electrically connected to the cable reel assembly for receiving electricity from the electrical power supply. The second end of the cable is electrically attached to a car, such as a scrap car in a steel mill, for supplying power to the car. As the car moves away from the reel, cable is paid out from the reel. When the car moves back toward the cable reel, the torsional spring acting on the cable reel rewinds the cable back onto the spool. When the temporary supply of electrical power is no longer required, the cable is detached from the apparatus and a torsional spring acting on the cable reel rewinds the cable onto the spool. The torque exerted by the torsional spring on the take-up reel assembly causes the paid-out cable to be taken-up by the spool.

In existing cable reel assembly applications, only one clutch assembly is used. Thus, the torque required by the application for which the cable reel assembly is to be used dictates the size of the clutch assembly. Accordingly, the larger the torque required, the larger the clutch assembly required to meet that demand. As the size of the clutch assembly increases radially, the size of the frame required to support the clutch assembly increases. Some cable reel assembly applications have space limitations. Thus, a large frame is not a viable option. A need exists for providing larger amounts of torque without greatly increasing the size of the frame.

Furthermore, meeting the torque demands for a variety of applications requires manufacturing of several different sized clutch assemblies, thereby increasing manufacturing costs and inventory. A need exists for a single clutch assembly that is capable of meeting the torque demands of a variety of applications while reducing manufacturing costs and keeping the amount of inventory small.

Examples of prior rotary clutch assemblies are disclosed in the following U.S. Pat. No. : 2,902,125 to House et al.; U.S. Pat. No. 3,360,927 to Cornelius; U.S. Pat. No. 4,461,375 to Brown; and U.S. Pat. No. 5,632,453 to Hioki et al.

Thus, there is a continuing need to provide improved rotary clutch assemblies.

SUMMARY OF THE INVENTION

Accordingly, it is a primary objective to provide a single clutch assembly that meets the variety of torque demands required by different cable reel assembly applications, thereby reducing the required inventory of parts and decreasing the manufacturing costs.

Another object of the invention is to provide a clutch assembly mountable on a shaft and adaptable to engage further clutch assemblies on the same shaft to provide the torque required by an application, thereby increasing the torque capacity without increasing the size of the frame.

The foregoing objects are basically attained by providing a rotary clutch assembly that comprises a first hub having first and second ends, the first hub having an inner surface defined by a first internal passageway extending from the first end to the second end for receiving a shaft, one of the first and second ends of the first hub having a first notch; and a second hub having first and second ends and an outer surface, the second hub having an inner surface defined by a second internal passageway extending from the first end to the second end for receiving the first hub, one of the first and second ends of the second hub having a second notch.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring now to the drawings that form a part of this original disclosure.

DETAILED DESCRIPTION OF THE INVENTION

Figure 1:
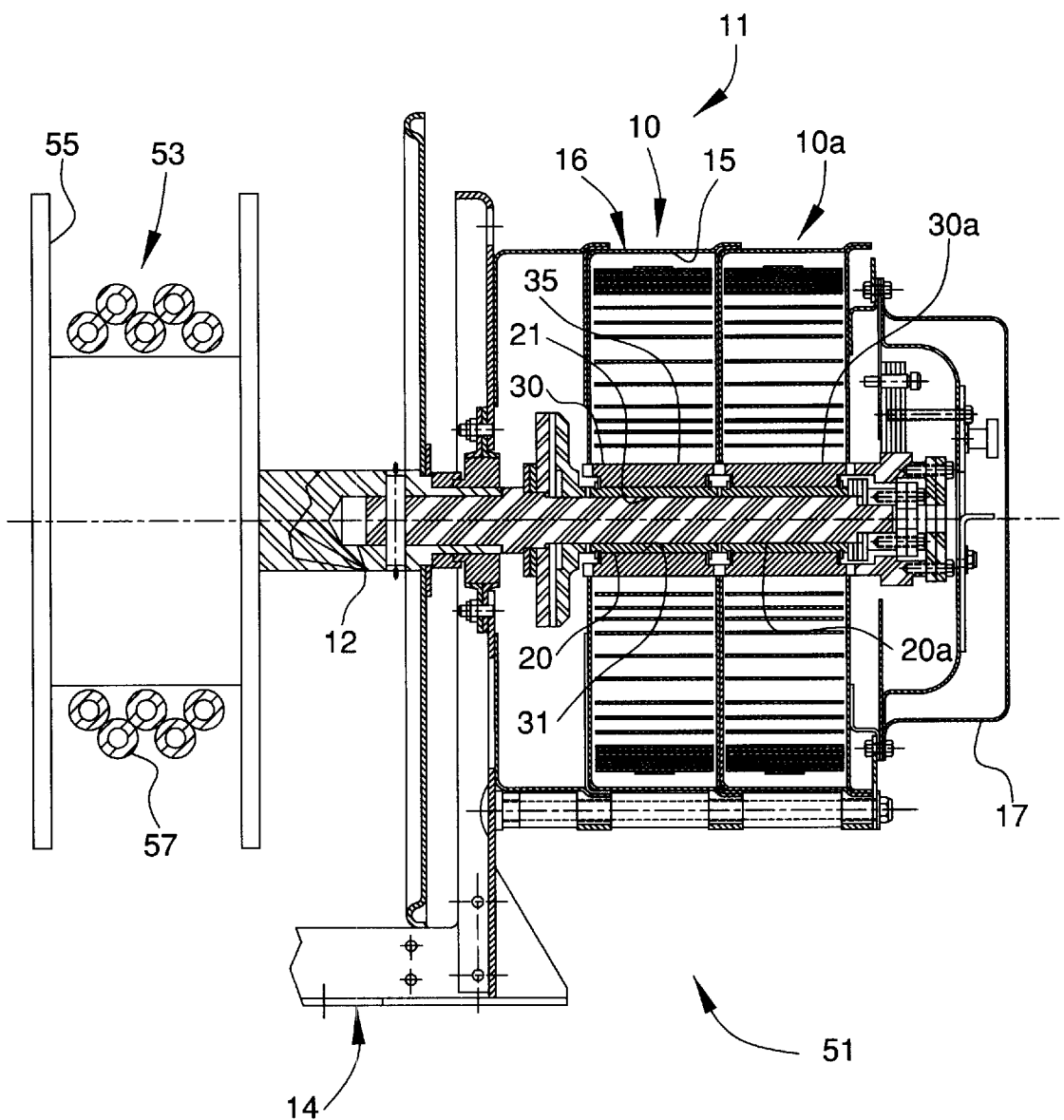
FIG. 1 is a front elevational view in longitudinal section of two clutch assemblies according to the present invention coupled together on a single shaft.

As seen in FIGS. 1–9, a drive assembly 11 includes at least one rotary clutch assembly 10 mounted on a shaft 12 for providing torque to the shaft. The shaft is connected to a spool 55 of a reel assembly 53. Providing torque to the shaft 12 drives the spool 55, which draws in cable 57 connected to the spool. As shown in FIG. 1, the rotary clutch assembly 10 includes a first hub 20 (i.e., an inner hub or an output hub) that receives the shaft and a second hub 30 (i.e., an outer hub or an input-hub) that receives the first hub. The first and second hubs are enclosed within a housing 16 that is mounted to the frame 14. The clutch assembly 10 is adapted for coupling to a second rotary clutch assembly 10a on the same shaft 12, thereby increasing the overall torque capacity of the drive assembly 11 without increasing radial size of the frame 14 required to support the drive assembly. Each additional clutch assembly mounted on the shaft 12 provides a 100% increase in the torque capacity of the drive assembly 11. Since the clutch assemblies are identical, the elements of the second clutch assembly 10a use the same numbers as the first clutch assembly 10 followed by the letter "a". Although only two clutch assemblies 10 and 10a are shown coupled together on a single shaft, the present invention provides for any number of clutch assemblies to be coupled together on a single shaft to form the drive assembly.

The cable reel assembly 51 comprises a frame 14 (FIG. 1) to which the reel assembly 53 and the drive assembly 11 are mounted. The reel assembly includes a spool 55 on which the cable 57 is wound. Shaft 12 is connected to the spool 55. The rotary clutch assembly 10 is connected to shaft 12 to provide torque for driving the shaft, which, in turn, drives the spool. The rotary clutch assembly 10 is contained within housing 16, which is mounted to frame 14.

Figure 2:
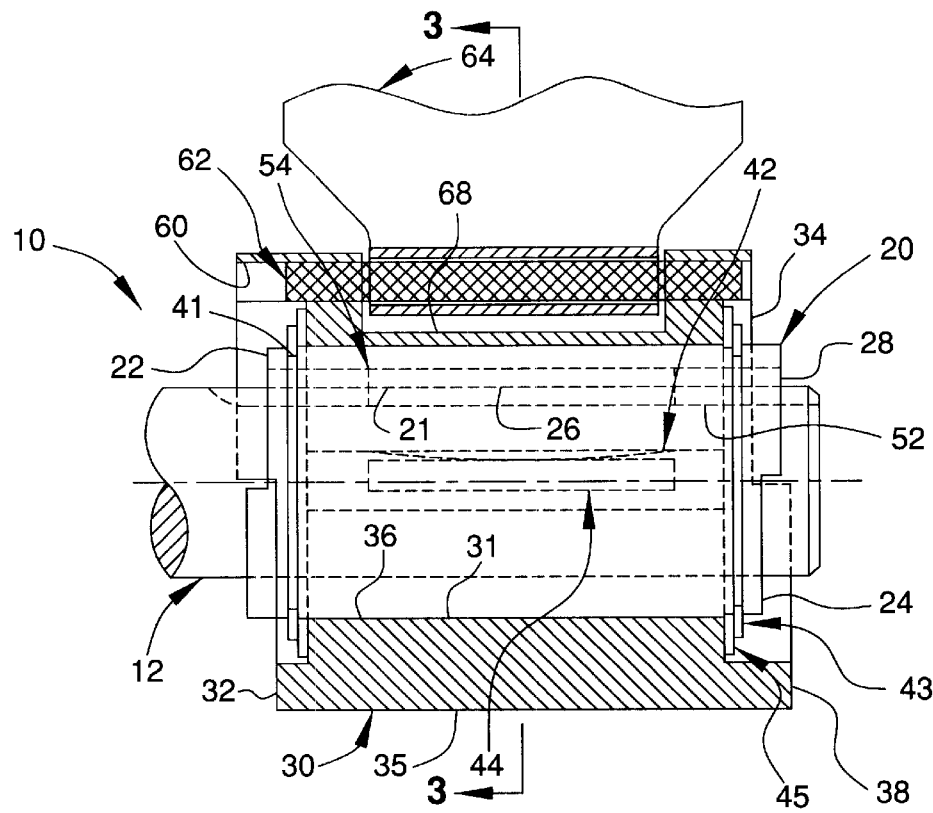
FIG. 2 is a front elevational view in partial section of one of the clutch assemblies of FIG. 1.
Figure 3:
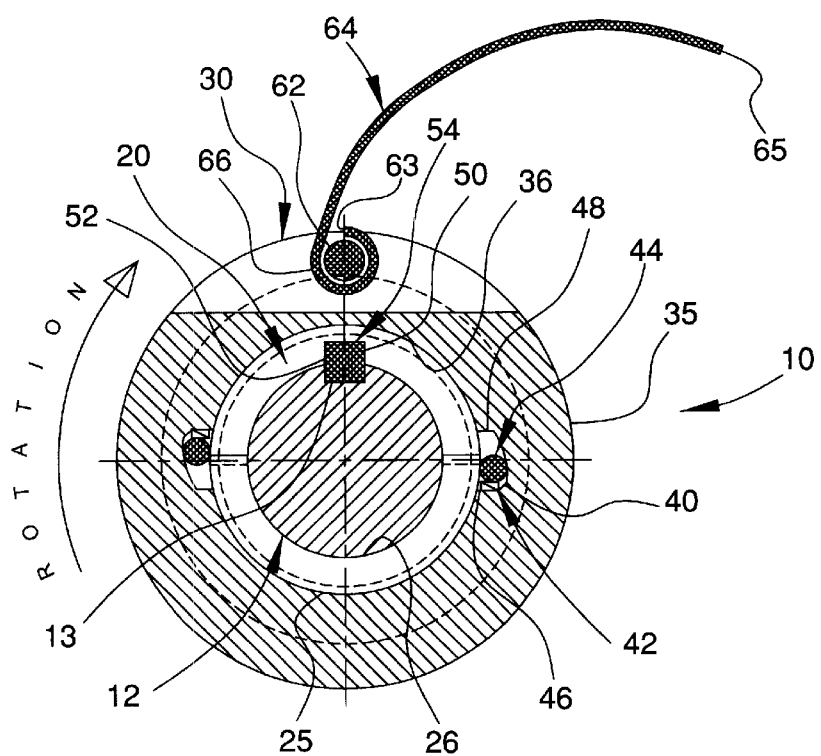
FIG. 3 is a side elevational view in section taken along line 3—3 in FIG. 2 of the clutch assemblies of FIG. 2.

The first hub 20, shown in FIGS. 1–3, has a first end 22 and a second end 24. An inner surface 26 of first hub 20 is defined by a first internal passageway 21 extending from first end 22 to second end 24 for receiving shaft 12. One of the first and second ends of first hub 20 has a first notch 28. Preferably, both first and second ends 22 and 24 have a first notch 28.

The second hub 30, shown in FIGS. 1–3, has a first end 32, a second end 34, and an outer surface 35. An inner surface 36 of second hub 30 is defined by a second internal passageway 31 extending from first end 32 to second end 34 for receiving first hub 20. One of the first and second ends of second hub 30 has a second notch 38. Preferably, both first and second ends 32 and 34 have a second notch 38.

The first notch 28 of first hub 20 is substantially step-shaped, as shown in FIGS. 2–5. The second notch 38 of second hub 30 is substantially step-shaped. First clutch assembly 10 may be fixedly coupled to second clutch assembly 10a, as shown in FIGS. 1–5, to rotate together by interlocking the first and second notches 28 and 38 of the first clutch assembly with the first and second notches 28a and 38a of the second clutch assembly.

Figure 8:
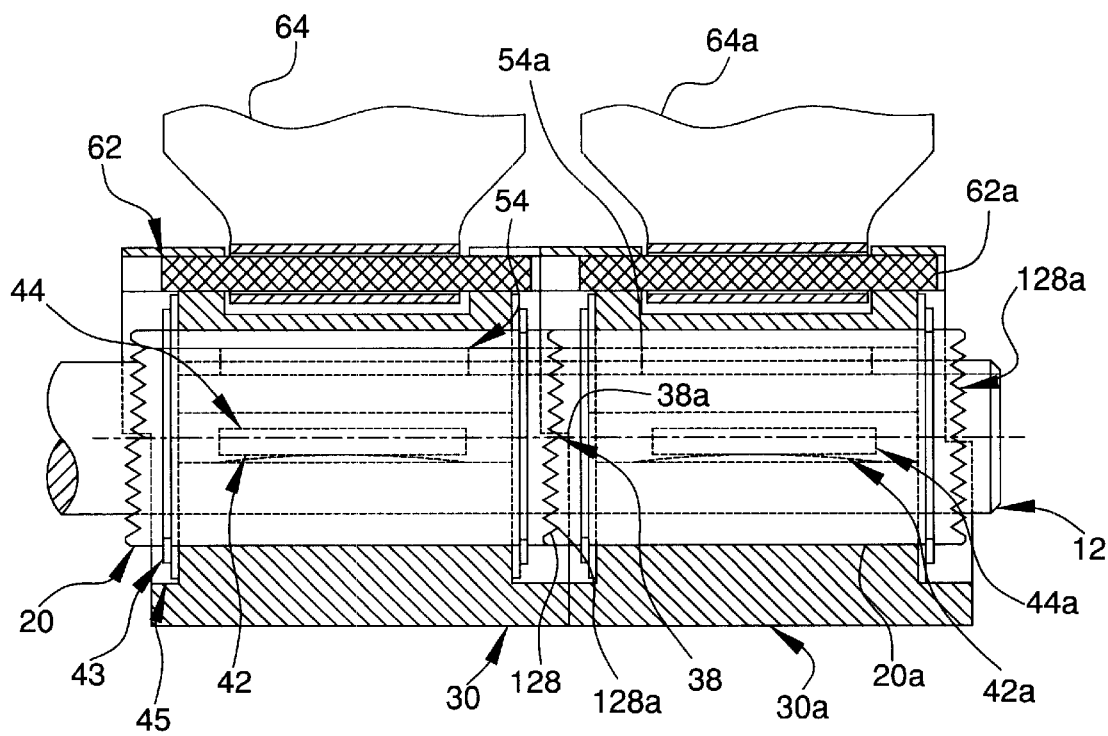
FIG. 8 is a front elevational view in partial section of the two clutch assemblies of FIG. 6 coupled to a single shaft.
Figure 9:
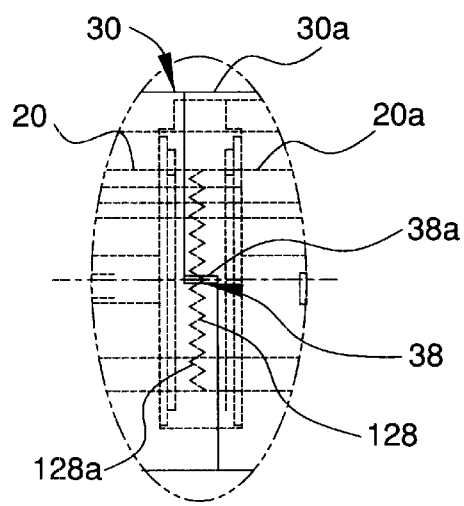
FIG. 9 is an enlarged front elevational view of a portion of FIG. 8 showing the interlocking hubs of the two clutch assemblies of FIG. 8.

Alternatively, first notch 128 is substantially V-shaped, as shown in FIGS. 6–9. Each substantially V-shaped notch 128 has a first leg 130 and a second leg 132. Preferably, angle 134 formed between the first and second legs is approximately 63 degrees, providing approximately thirty-six substantially V-shaped notches. First clutch assembly 10 may be fixedly coupled to second clutch assembly 10a, as shown in FIGS. 8–9, to rotate together by interlocking the first and second notches 128 and 38 of the first clutch assembly 10 with the first and second notches 128a and 38a of the second clutch assembly.

First groove 40 extends longitudinally along inner surface 36 of second hub 30 from first end 32 to second end 34. First groove 40 has a large end 46 and a small end 48. The large end 46 of first groove 40 has a larger radius than small end 48. Locking member 44 is positioned adjacent first spring 42 within first groove 40. First spring 42 is positioned at the large end 46 of first groove 40, and thus, the spring pushes the locking member toward the small end 48 of the first groove. Preferably, second hub 30 has two first grooves 40 positioned approximately 180 degrees apart, as shown in FIG. 3. A snap ring 43 and washer 45 are positioned at first and second ends of first hub to maintain first springs 42 and locking members 44 within first grooves 40. A radial groove 41 proximal first and second ends 22 and 24 receives the snap ring 43, thereby locking the first spring 42 and locking member within first hub 20. First groove 40, first springs 42 and locking member 44 in second hub 30 maintain a rotational relationship between second hub 30 and first hub 20 during rotation in a first direction. Rotation in a second direction allows first hub 20 and second hub 30 to rotate independently of the other. For the configuration shown in FIG. 3, clockwise rotation of the clutch assembly 10 moves first locking member 44 to the small end 48 of first groove 40, thereby locking first hub 20 and second hub 30 in a fixed relationship relative to one another. Rotation in the counterclockwise direction moves first locking member 44 to the large end 46 of first groove 40 allowing first hub 20 and second hub 30 to rotate independently of the other.

Second groove 50 in first hub 20 corresponds to a groove 13 in shaft 12 and extends longitudinally along inner surface 26 of first hub 20 from first end 22 to second end 24. When first hub 20 and shaft 12 are properly aligned, a slot 52 is formed between first hub 20 and shaft 12. A key 54 is disposed in slot 52 to lock said first hub and shaft 12 in a fixed relationship, regardless of the direction of rotation.

Third internal passageway 60 extends longitudinally from first end 32 to second end 34 of second hub 30, spanning a recess 68 in the outer surface of second hub 30. A pin 62 is disposed within third groove 60. Recess 68 provides access so second spring 64 may be attached to pin 62. Preferably, second spring 64 is a convoluted or torsional spring. A loop 66 at first end 63 of second spring 64 is connected to pin 62. Second end 65 of spring 63 is connected to inner wall 15 of clutch assembly housing 16. Preferably, second end 65 of spring 63 is attached to a hinge clamp on inner wall 15 of clutch assembly housing 16.

ASSEMBLY AND DISASSEMBLY

The rotary clutch assembly of the present invention improves safety and reduces machine down-time during handling and service. First springs 42 and locking members 44 that lock first hub 20 and second hub 30 in a fixed relationship are encapsulated inside the clutch assembly 10 by first groove 40 in second hub 30 and outer surface 25 of first hub 20. When installing clutch assembly 10 onto shaft 12, the technician does not touch these precision machined and lubricated parts that otherwise could become contaminated, damaged, or lost during maintenance or spring motor replacement. The clutch assembly 10 is assembled integrally with the second spring 64 inside a permanently assembled housing 16 (FIG. 1). When a clutch assembly 10 fails and must be replaced, the entire clutch assembly is removed and discarded. A new clutch assembly 10 is installed on the same shaft using key 54 for fixing the shaft to the first hub 20 of the clutch assembly. Second groove 50 of first hub 20 of the clutch assembly 10 is lined up with shaft groove 13. Key 54 is inserted into slot 52 formed by second groove 50 and shaft groove 13 to fixedly lock first hub 20 to shaft 12 to rotate together. Cover 17 (FIG. 1) is attached to the housing 16 to enclose the end of the clutch assembly from which the key was inserted. Shaft 12 is stronger than existing clutch assemblies since the first groove for locking members is in the first hub, rather than the shaft as in many existing clutch assemblies, thereby increasing fatigue life and torque capacity since the shaft's cross-section is greater and stress concentration points are reduced by fifty percent. The clutch assembly of the present invention allows a customer to purchase the clutch assembly 10, while supplying their own shaft 12 to interface with the clutch assembly, thereby saving labor and material costs.

The clutch assembly 10 of the present invention also improves versatility by using the same assembly for either standard or reverse rotation options. This is accomplished by installing the second hub 30 and second spring 64 on the first hub 20 in the opposite orientation from that shown in FIG. 3, thereby reversing the direction of rotation.

The clutch assembly 10 is assembled by sliding second hub 30 over first hub 20. Washer 45 is then slid over first hub 20 until it rests against first end 32 of second hub 30. Snap ring 43 is then slid over first hub 20 until it rests in radial groove 41 of first hub 20. Locking members 44 and first springs 42 are then inserted into first grooves 40 from second end 24 of first hub 20. First springs 42 are positioned to force locking members 44 toward the small end 48 of first grooves 40. The second hub 30 is positioned around the first hub 20 to capture locking members 44 and second springs 42 between first grooves 40 and outer surface 25 of first hub 20. An identical washer 45 and snap ring 43 are then attached in the same manner to second end 24 of first hub 20. Pin 62 is press-fit in third internal passageway 60 that spans recess 68. First end 63 of second spring 64 has a loop that is then pivotally anchored to second hub 30 with pin 62. Loop 66 at first end 63 of second spring 64 is secured to pin 62. Second end 65 of second spring 64 is anchored to the inner wall 15 of housing 16, which houses the entire clutch assembly. Cover 17 is then attached to housing 16 to completely enclose the first and second hubs. The cover 17 is removed when installing the clutch assembly on shaft 12 so that the shaft groove 13 may be aligned with second groove 50 in first hub 20. Once key 54 has been inserted to lock first hub 20 to shaft 12, cover 17 is reattached to housing 16 to completely enclose clutch assembly 10.

The number of turns and torque output available from any given clutch assembly 10 is dependent upon second spring 64 material type, length, width, thickness, housing 16 inner diameter, second hub 30 outer diameter, and frictional losses. Second spring 64 is "energized" when the spring is wound tightly around the second hub 30. The torque output to shaft 12 is applied in the same direction that second spring 64 is wound around the second hub 30 (clockwise direction in FIG. 3). The axial position of second hub 30 and second spring 64 is maintained on shaft 12 by housing 16 that houses second spring 64 and a snap ring 43 installed in a corresponding radial groove 41 on input hub 20. Rotation is applied in a clockwise direction to the input hub by second spring 64. Rotation of second hub 30 rolls locking members 44 toward the small end 48 of grooves 40 in second hub 30, causing them to bind tightly. Once locking members 44 are pinched between first hub's outer surface 25 and first grooves 40 in second hub 30, all three parts (shaft 12, first hub 20 and second hub 30) are locked in rotational relationship to each other. Any rotation and torque transmitted from the second spring 64 to the second hub 30 is also transmitted to shaft 12. First springs 42 bias locking members 44 to maintain contact between locking members 44 and outer surface 25 of first hub 20 and second hub portion of first groove 40. This bias allows input torque and rotation to be instantly transmitted from the second spring 64 to shaft 12. Conversely, when torque and rotation are input at second hub 30 in a counter-clockwise direction (when configured as shown in FIG. 3), the second hub 30 winds spring 64 onto its outer surface 35, adding torque and turns to clutch assembly 10. Counter-clockwise rotation of second hub 30 rolls locking members to large end 48 of first grooves 40, so that the locking members spin in place while the second hub 30 rotates without moving first hub 20 and shaft 12.

The advantage of a drive assembly having rotary clutch assembly for driving the spool on a cable take-up reel is for installation of the cable and pre-tension. One end of the cable 57 is terminated within the spool 55 on the reel assembly 53. The cable is then wound onto the spool by rotating the spool in the reverse or retrieve direction. This disengages the shaft 12 from the second hub to prevent back-winding the spring 64. The spring 64 is unwound inside the housing 16 so the convolutions are laying tightly against the inner surface 15 of the housing 16. When the spring is in this condition, no torque is applied to the second hub 30 of clutch assembly 10. After the cable is completely wound onto the spool, the opposite or loose end is terminated at the movable machine. Frequently, one or more forward turns of the spool is required to add pre-tension or torque to the spring 64 so there is always some tension in the cable. This prevents undesirable slack or sag of the cable that may cause interference with nearby machine components and equipment. After a cable has been installed completely on the reel and both ends terminated, pre-tension may be added using a special tool supplied with the reel. The tool allows rotation of the second hub 30 to wind the spring tighter, thereby increasing the torque and tension applied to the cable. When rotating the spool in the reverse (retrieve) direction or rotating the second hub 30 in a counter-clockwise direction (winding the second spring 64 tighter onto second hub 30), the locking members 44 in the clutch assembly 10 roll toward the large end 46 of first grooves 40 in second hub 30 and against the force of the first springs 42. Locking members 44 spin in place without binding to permit continuous rotation of first hub 20 and shaft 12 without rotating second hub 30 and vice versa.

Several different clutch assemblies are required to satisfy the majority of cable and hose reel applications. The size of the housing for a clutch assembly is partially dependent on the physical size of the reel or frame. The reel's frame size dictates the capacity to stretch or lift and store a given size and length of cable or hose conductor. When the torque and turns capacity for any individual clutch assembly is exceeded and available space or cost limitations do not allow the reel's frame size to be increased, two or more clutch assemblies are required. These are configured in parallel for high torque applications.

The clutch assemblies 10 and 10a (FIG. 1) are stacked axially along shaft 12 with the second hubs 30 and 30a and the first hubs 20 and 20a of the clutch assemblies coupled together to form the drive assembly 11. This parallel configuration increases the torque capacity of the drive assembly 11 by 100% for each additional clutch assembly. For example, if a drive assembly having one clutch assembly provides 30 lbs-ft torque, two clutch assemblies provide a drive assembly having 60 lbs-ft torque.

Figure 4:
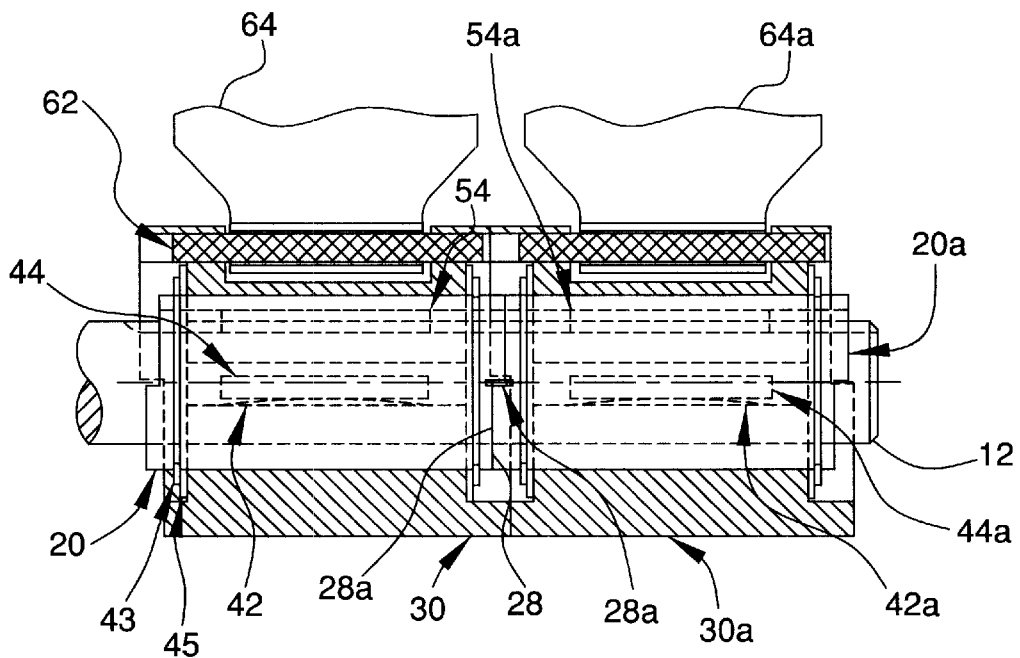
FIG. 4 is a front elevational in partial section view of the two clutch assemblies of FIG. 1 coupled on a single shaft.
Figure 5:
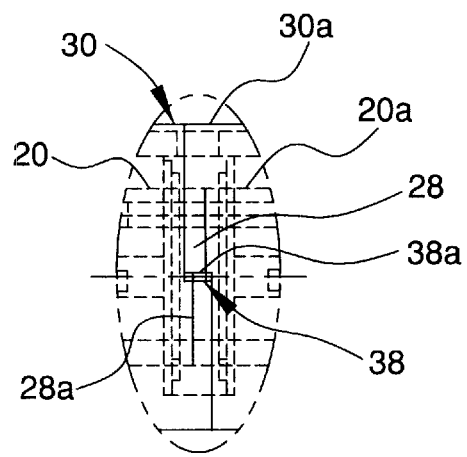
FIG. 5 is an enlarged front elevational view of a portion of FIG. 4 showing the interlocking hubs of the two clutch assemblies of FIG. 4.
Figure 6:
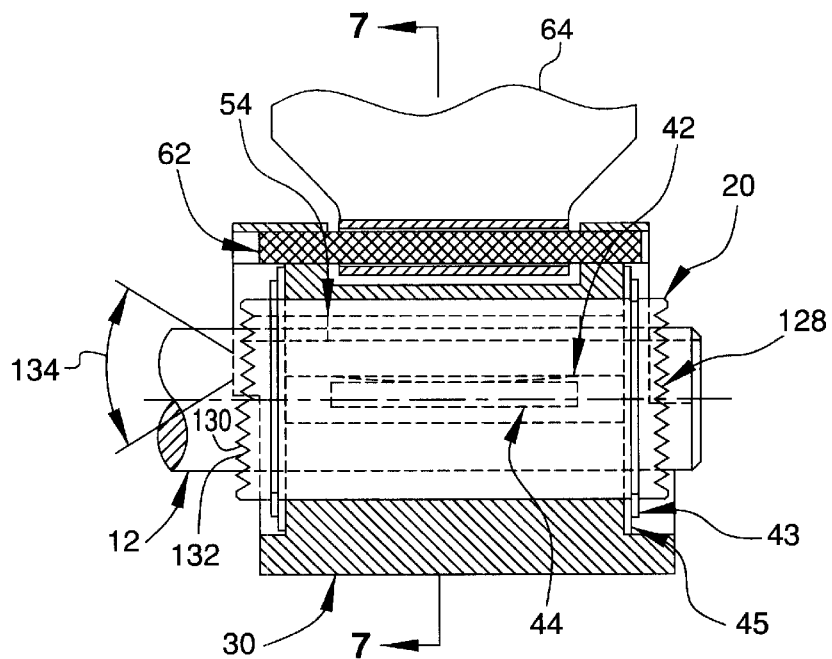
FIG. 6 is a front elevational view in partial section of a clutch assembly according to a second embodiment of the present invention.
Figure 7:
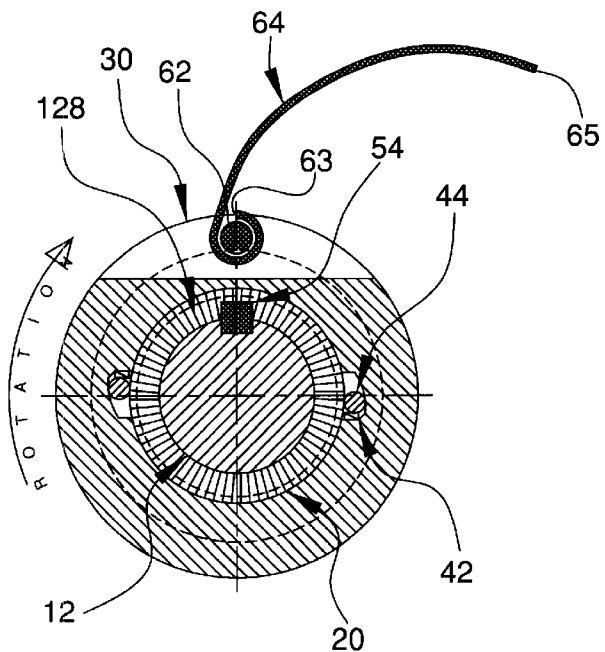
FIG. 7 is a side elevational view in section taken along line 7—7 in FIG. 6 of the clutch assembly of FIG. 6.

The clutch assembly of the present invention does not require additional parts to couple first and second hubs of two or more clutch assemblies together. First notch 28 and second notch 38 on an end of first and second hubs interlock with first notch 28a and second notch 38a on an end of first and second hubs of second clutch assembly 10a, as shown in FIGS. 4 and 5, so that multiple clutch assemblies may be mounted adjacent to one another on the same shaft 12. These notches may in the form of complimentary steps or protrusions, such as substantially V-shaped teeth positioned radially about the hub. Once the second notches 38 and 38a have been engaged, first hubs 20 and 20a are manipulated to subsequently align first notches 28 and 28a. Preferably first notches 128 and 128a are substantially V-shaped notches, as shown in FIGS. 8 and 9. With such a configuration, once second notches 38 and 38a have been aligned, first notches 128 and 128a automatically fall into place due to their shape providing an easy alignment process.

While advantageous embodiments have been chosen to illustrate the invention, it will be understood by those skilled in the art that various changes and modifications may be made therein without departing from the scope of the invention as defined in the appended claims.

What is claimed is:

1. A rotary clutch assembly, comprising:
   a first hub having first and second ends, said first hub having an inner surface defined by a first internal passageway extending from said first end to said second end for receiving a shaft, one of said first and second ends of said first hub having a first notch;
   a second hub having first and second ends and an outer surface, said second hub having an inner surface defined by a second internal passageway extending from said first end to said second end for receiving said first hub, one of said first and second ends of said second hub having a second notch;
   a first groove extending longitudinally along said inner surface of said second hub;
   a first spring disposed within said first groove; and
   a first locking member disposed adjacent said first spring within said first groove.

2. The clutch assembly of claim 1, further comprising
   a third internal passageway extending from said first end to said second end of said second hub;
   a pin disposed within said third internal passageway; and
   a second spring connected to said pin for imparting motion to the shaft.

3. The clutch assembly of claim 1, further comprising
   a second groove in the first hub corresponding to a groove in the shaft, said second groove and the shaft groove forming a slot; and
   a key disposed in said slot to lock said first hub and the shaft in rotational relationship.

4. The clutch assembly of claim 1, wherein
   said first notch comprises a plurality of substantially V-shaped notches.

5. The clutch assembly of claim 4, wherein
   each V-shaped notch has first and second legs, and the angle formed between said first and second legs is approximately 63 degrees.

6. The clutch assembly of claim 4, wherein
   said first notch comprises approximately thirty-six substantially V-shaped notches.

7. The clutch assembly of claim 1, wherein
   said first notch comprises a plurality of substantially step-shaped notches.

8. The clutch assembly of claim 1, wherein
   said second notch comprises a plurality of substantially step shaped notches.

9. The clutch assembly of claim 1, further comprising
   a third groove extending longitudinally along said inner surface of said second hub;
   a third spring disposed within said third groove; and
   a second locking member disposed adjacent said third spring within said third groove.

10. A drive assembly, comprising:
    a first rotary clutch assembly, including
       a first hub having first and second ends, said first hub having an inner surface defined by a first internal passageway extending from said first end to said second end for receiving a shaft, one of said first and second ends of said first hub having a first notch;
       a second hub having first and second ends and an outer surface, said second hub having an inner surface defined by a second internal passageway extending from said first end to said second end for receiving said first hub, one of said first and second ends of said second hub having a second notch; and
    a second rotary clutch assembly, including
       a third hub having first and second ends, said third hub having an inner surface defined by a third internal passageway extending from said first end to said second end for receiving a shaft, one of said first and second ends of said third hub having a third notch for connecting to said first notch;
       a fourth hub having first and second ends and an outer surface, said fourth hub having an inner surface defined by a fourth internal passageway extending from said first end to said second end for receiving said third hub, one of said first and second ends of said fourth hub having a fourth notch for connecting to said second notch.

11. The drive assembly of claim 10, further comprising
    a first groove extending longitudinally along said inner surface of said second hub;
    a first spring disposed within said first groove; and
    a first locking member disposed adjacent said first spring within said first groove.

12. The drive assembly of claim 10, further comprising
    said fourth hub having a second groove extending longitudinally along said inner surface;
    a second spring disposed within said second groove; and
    a second locking member disposed adjacent said second spring within said second groove.

13. The drive assembly of claim 10, wherein
    fifth and sixth internal passageways extending from said first end to said second end of said second and fourth hubs, respectively;
    first and second pins disposed within said fifth and sixth internal passageways, respectively; and
    third and fourth springs connected to said first and second pins for imparting motion to the shaft.

14. The drive assembly of claim 10, further comprising
    third and fourth grooves in the first and third hubs, respectively, said third and fourth grooves corresponding to a groove in the shaft to form first and second slots, and
    first and second keys disposed in said first and second slots to lock said first and third hubs and the shaft in rotational relationship.

15. The drive assembly of claim 10, wherein
    said first and third notches are substantially V-shaped.

16. The drive assembly of claim 15, wherein
    each said V-shaped notch has a first leg and a second leg, and the angle formed between said first and second legs is approximately 63 degrees.

17. The drive assembly of claim 15, wherein
    each of said first and third notches comprise approximately thirty-six substantially V-shaped notches.

18. The drive assembly of claim 10, wherein
    said first and third notches are substantially step-shaped.

19. The drive assembly of claim 10, wherein
    said second and fourth notches are substantially step shaped.

20. The drive assembly of claim 10, further comprising
fifth and sixth grooves extending longitudinally along said inner surface of said second and fourth hubs, respectively;
fifth and sixth springs disposed within said fifth and sixth grooves, respectively; and
third and fourth locking members disposed adjacent said fifth and sixth springs within said fifth and sixth grooves, respectively.

21. A method of forming a drive assembly, comprising the steps of:
locking a first clutch assembly in rotational relationship with a shaft;
positioning a second clutch assembly on the shaft;
interlocking a first notch on a first hub of the first clutch assembly with a second notch on a second hub of the second clutch assembly to lock the first and second clutch assemblies in rotational relationship; and
interlocking a third notch on a third hub of the first clutch assembly with a fourth notch on a fourth hub of the second clutch assembly.

22. The method of forming a drive assembly according to claim 21, further comprising
adding further clutch assemblies to the shaft by interlocking a first end notch of an end hub of an additional clutch assembly with a second end notch on an end hub of an installed clutch assembly.

23. A rotary clutch assembly, comprising:
a first hub having first and second ends, said first hub having an inner surface defined by a first internal passageway extending from said first end to said second end for receiving a shaft, one of said first and second ends of said first hub having a first notch;
a second hub having first and second ends and an outer surface, said second hub having an inner surface defined by a second internal passageway extending from said first end to said second end for receiving said first hub, one of said first and second ends of said second hub having a second notch;
a third internal passageway extending from said first end to said second end of said second hub;
a pin disposed within said third internal passageway; and
a second spring connected to said pin for imparting motion to the shaft.

24. The clutch assembly of claim 23, further comprising
a first groove extending longitudinally along said inner surface of said second hub;
a first spring disposed within said first groove; and
a first locking member disposed adjacent said first spring within said first groove.

25. The clutch assembly of claim 23, further comprising
a second groove in the first hub corresponding to a groove in the shaft, said second groove and the shaft groove forming a slot; and
a key disposed in said slot to lock said first hub and the shaft in rotational relationship.

26. The clutch assembly of claim 23, wherein
said first notch comprises a plurality of substantially V-shaped notches.

27. The clutch assembly of claim 26, wherein
each V-shaped notch has first and second legs, and the angle formed between said first and second legs is approximately 63 degrees.

28. The clutch assembly of claim 26, wherein
said first notch comprises approximately thirty-six substantially V-shaped notches.

29. The clutch assembly of claim 23, wherein
said first notch comprises a plurality of substantially step-shaped notches.

30. The clutch assembly of claim 23, wherein
said second notch comprises a plurality of substantially step shaped notches.

31. The clutch assembly of claim 23, further comprising
a third groove extending longitudinally along said inner surface of said second hub;
a third spring disposed within said third groove; and
a second locking member disposed adjacent said third spring within said third groove.

32. A method of forming a drive assembly, comprising the steps of:
locking a first clutch assembly in rotational relationship with a shaft;
positioning a second clutch assembly on the shaft;
interlocking a first notch on a first hub of the first clutch assembly with a second notch on a second hub of the second clutch assembly to lock the first and second clutch assemblies in rotational relationship; and
adding further clutch assemblies to the shaft by interlocking a first end notch of an end hub of an additional clutch assembly with a second end notch on an end hub of an installed clutch assembly.

33. The method of forming a drive assembly according to claim 32, further comprising
interlocking a third notch on a third hub of the first clutch assembly with a fourth notch on a fourth hub of the second clutch assembly.

34. A rotary clutch assembly, comprising:
a first hub having first and second ends, said first hub having an inner surface defined by a first internal passageway extending from said first end to said second end for receiving a shaft, at least one of said first and second ends of said first hub having a first notch adapted to be connected to a first notch of a first hub of a second rotary clutch assembly; and
a second hub having first and second ends and an outer surface, said second hub having an inner surface defined by a second internal passageway extending from said first end to said second end for receiving said first hub, at least one of said first and second ends of said second hub having a second notch adapted to be connected to a second notch of a second hub of the second clutch assembly.

35. The clutch assembly of claim 34, further comprising
a first groove extending longitudinally along said inner surface of said second hub;
a first spring disposed within said first groove; and
a first locking member disposed adjacent said first spring within said first groove.

36. The clutch assembly of claim 34, further comprising
a third internal passageway extending from said first end to said second end of said second hub;
a pin disposed within said third internal passageway; and
a second spring connected to said pin for imparting motion to the shaft.

37. The clutch assembly of claim 34, further comprising a second groove in the first hub corresponding to a groove in the shaft, said second groove and the shaft groove forming a slot; and a key disposed in said slot to lock said first hub and the shaft in rotational relationship.

38. The clutch assembly of claim 34, wherein said first notch comprises a plurality of substantially V-shaped notches.

39. The clutch assembly of claim 38, wherein each V-shaped notch has first and second legs, and the angle formed between said first and second legs is approximately 63 degrees.

40. The clutch assembly of claim 38, wherein said first notch comprises approximately thirty-six substantially V-shaped notches.

41. The clutch assembly of claim 34, wherein said first notch comprises a plurality of substantially step-shaped notches.

42. The clutch assembly of claim 34, wherein said second notch comprises a plurality of substantially step shaped notches.

43. The clutch assembly of claim 34, further comprising a third groove extending longitudinally along said inner surface of said second hub;

a third spring disposed within said third groove; and a second locking member disposed adjacent said third spring within said third groove.

* * * * *